June 30, 1964 F. SECRETAN 3,139,537
LOW FREQUENCY SQUARE WAVE TO SINE WAVE SHAPER
Filed Dec. 12, 1960
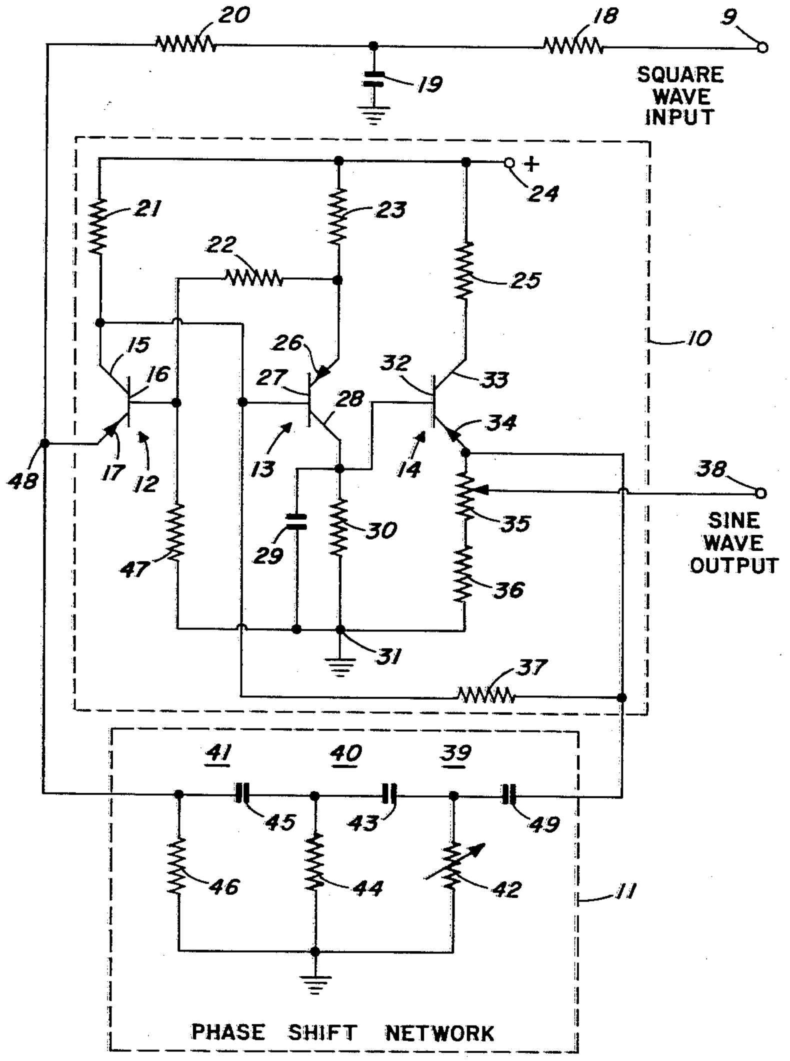
INVENTOR.
FRANK SECRETAN
BY Moody & Anderson
AGENTS 3,139,537
Patented June 30, 1964

1

3,139,537

LOW FREQUENCY SQUARE WAVE TO SINE WAVE SHAPER

Frank Secretan, Santa Ana, Calif., assignor to Collins Radio Company, Cedar Rapids, Iowa, a corporation of Iowa Filed Dec. 12, 1960, Ser. No. 75,331
3 Claims. (Cl. 307—88.5)

This invention relates generally to the generation of sinusoidal waveforms from a source of reoccurring non-sinusoidal pulses and specifically to a means for generating a low frequency sine wave from a source of symmetrical square waves. More particularly, the present invention provides a means for converting a symmetrical square wave having a low repetition rate in the order of one cycle per second to a pure sinusoidal output wave having a frequency equal that of the fundamental harmonic of the square wave.

Converters or generators are known in the art which produce sinusoidal waveforms under the control of pulsed inputs. Such circuitry might, for example, convert a train of periodic pulses to a sinusoidal wave with frequency equal to the pulse repetition rate of the input signal or with frequency equal that of some harmonic of the pulse repetition rate of the incoming signal. Such circuitry essentially excites an LC tank circuit with each incoming pulse such that the tank circuit oscillates at a frequency related to the pulse repetition rate of the exciting pulses.

Ofttimes, however, it may be desirable to generate a pure sinusoidal voltage or signal of a low frequency and known circuitry or expedients are not readily adaptable to producing sinusoidal waveforms where the frequency required may be as low as one cycle per second. While such a low frequency might be machine generated, such devices do not provide a pure sine-wave output but rather one of the incremental steps which follow a sinusoidal pattern. In applications wherein the sine wave to be generated must be phase-locked with a controlling square wave, the sine waves must be electronically generated. The use of LC tank circuitry for the generation of low frequency sine waves is encumbered and may even be rendered impossible due to the extremely large values of capacitance and inductance parameters which would have to be incorporated to produce resonant circuitry at low frequencies.

It is an object, therefore, of the present invention to provide a means for generating a low frequency sine wave by electronic conversion of a square wave.

A further object of the present invention is to provide a square-wave to sine-wave converter capable of operating at frequencies well below those possible with conventional resonant circuits while maintaining an accurate phase relationship between the sine wave and square wave.

Still a further object of the present invention is the provision of a square-wave to sine-wave converter utilizing phase shift techniques and employing resistance and capacitance elements throughout with no serious design limitations being encountered due to impractical physical characteristics of the elements involved.

The present invention is featured in the provision of a nonoscillating signal amplification means, including phase shifting feedback means between the input and output terminals thereof, wherein the phase shifting means is selectively operable at the fundamental frequency of the square-wave input which is to be converted.

2

Further features and objects of the present invention will become apparent upon reading the following description in conjunction with the accompanying drawing in which the single figure is a schematic diagram of the embodiment of the invention.

The square-wave converter of the present invention operates upon the principle of providing a regenerative feedback in an amplifying means at the fundamental frequency of the square wave to be converted. The converter is operable at low frequencies in the order of one cycle per second due to the unique manner in which it develops a sinusoidal waveform under the control of a square-wave input. Square waves of low frequencies are readily generated. For example, one may generate a square-wave by means of a voltage source and a simple switch. However, to use such a square wave as a means of exciting convention oscillatory LC networks provides a definite limitation due to the extremely large inductance and capacitance requirements. The present invention, then, comprises an amplifying means in conjunction with a phase shifting network between the input and output networks thereof, whereby the circuit may be made to oscillate at low frequencies and to produce a sinusoidal output at the fundamental frequency of the controlling input square wave.

With reference to the figure, the present invention is seen to comprise an amplifying means generally designated by reference numeral 10, together with a phase shifting network 11 connected between the input and output terminals of the amplifier 10. A source of symmetrical square waves is applied to an input terminal 9 and is converted to a phase-locked sine wave at output terminal 38.

The present invention basically comprises a loop consisting of the amplifier 10 and phase shifting network 11; the loop exhibiting a gain just under unity such that in the absence of a square-wave input, no oscillation is present. With the presence of the square-wave input, the amplifier 10 provides a 180° phase shift of the incoming signal and the phase shifting network is designed to selectively shift the fundamental frequency component of the input square wave by an additional 180°, such that a regenerative feedback at the square-wave fundamental frequency is realized and the loop oscillates at the fundamental frequency of the square wave.

The present invention utilizes the principle that a symmetrical square wave may be expressed as a series of odd harmonics, including the fundamental, and that an appreciable amount of the energy in a square wave is contained in the fundamental with the third, fifth, and higher order odd harmonics exhibiting progressively and considerably lesser amounts of the total wave energy. Thus, phase shift network 11 is provided to phase shift the fundamental frequency of the square wave by 180° and, therefore, in conjunction with the 180° phase shift exhibited by the amplifier 10, provides a regenerative feedback to the amplifier 10 only at the fundamental frequency of the square wave. Frequency components corresponding to the higher order odd harmonics of the square-wave fundamental frequency are not shifted 180° by the network 11 and harmonics regeneration is, therefore, not realized. Thus, the circuit is designed to have a loop gain sufficiently less than unity to prevent self-oscillation in the absence of an input signal, and, in the presence of an input square wave, to oscillate at the fundamental frequency of the square wave so as to produce a pure sine-wave output at the output of the amplifier 10. The operation is, therefore, not one of ringing an oscillatory circuit by the application of periodic pulses thereto, but rather is a converter which transforms a symmetrical square wave into a phase-locked sine wave. With the present invention, phase-lock may be realized over a range of operating frequencies from one cycle per second to 40 c.p.s. or greater.

The illustrated embodiment of the present invention is seen to be comprised of a transistorized amplifying means 10 in conjunction with an RC phase shifting network 11. A square wave input applied to terminal 9 is coupled to the input terminal 48 of the amplifier 10 through a network comprised of resistors 18 and 20 and capacitor 19. The square wave input is, therefore, symmetrically applied about a ground reference to the input of the amplifier. The amplifier 10 is comprised of three transistorized stages which collectively phase shift the input signal by 180°.

The first stage of amplifier 10 is comprised of a transistor 12 utilized in a grounded-base configuration so as to exhibit signal amplification without phase inversion. The input square wave is applied between the emitter 17 and the base 16. The collector 15 is connected through a resistor 21 to a source 24 of positive direct-current voltage. The base 16 of transistor 12 is connected through a resistor 47 to a common ground terminal 31. A second amplifier stage is comprised of a transistor 13 whose base 27 is connected to the collector 15 of transistor 12. The emitter 26 of transistor 13 is connected through resistances 23 and 22 to the direct-current voltage source 24 and the base 16 of transistor 12, respectively. The collector 28 of transistor 13 is connected through a resistor 30 to ground terminal 31; the resistor 30 being shunted by a capacitor 29. Transistor 13 is seen to be connected as a conventional grounded collector amplifying stage in which the signal is amplified and inverted. Output from this second amplifying stage is taken from the collector 28 of transistor 13 and tied directly to the base 32 of a transistor 14 which comprises a third and output stage. The collector 33 of output transistor 14 is connected through a resistor 25 to the direct-current voltage source 24, while the emitter 34 is connected through resistance 35 and resistance 36 to the common ground 31. Output is taken from the emitter 34 and applied to the phase shifting network 11 and is further applied as an inverse feedback through resistor 37 to the base 27 of transistor 13 in the preceding stage. The sine-wave output is taken from a variable tap on resistance 35 to the output terminal 38. Transistor 14 is seen to be connected as a grounded emitter amplifying stage and thus, analogous to the electron tube cathode follower, the output from transistor 14 is in-phase with its input. The three stages making up the amplifier 10 thus collectively exhibit a 180° phase shift to the input signal.

The phase shifting network which provides a feedback path between the output of amplifier 10 and the input thereto is comprised of a plurality of RC filter networks 39, 40, and 41. The individual RC networks are selected to phase shift the fundamental frequency of the square-wave input signal by approximately 60°, such that the cascade arrangement collectively provides the necessary 180° phase shift. Thus, network 41 might be comprised of a resistor 46 and capacitor 45 having a time constant to introduce a 60° phase shift. Similarly, network 40 might be comprised of a resistor 44 and capacitor 43 to introduce a similar phase shift. Network 39 is seen to include capacitor 49 in conjunction with a variable resistance 42 so that the phase shift introduced by network 39 may be variable to adjust the collective phase shift of the entire network 11 to exactly 180° at the fundamental frequency of the square-wave input signal.

A square-wave converter which was caused to be constructed in accordance with the present invention produced a phase-locked sine-wave output from an eleven cycle per second symmetrical square-wave input utilizing the following circuit parameters:

| | | |
|---|---|---|
| Square-wave input | c.p.s. | 11 |
| Sine-wave output | c.p.s. | [1] 11 |
| Resistors: | | |
| 18 | ohms | 10,000 |
| 20 | do | 56,000 |
| 21 | do | 8,200 |
| 22 | do | 2,700 |
| 23 | do | 1,000 |
| 25 | do | 560 |
| 30 | do | 3,300 |
| 35 | do | 500 |
| 36 | do | 220 |
| 37 | do | 75,000 |
| 42 | do | 1,800 |
| 44 | do | 2,200 |
| 46 | do | 2,400 |
| 47 | do | 470 |
| Capacitors: | | |
| 19 | µf | 1 |
| 29 | µf | 0.1 |
| 41 | µf | 4.5 |
| 43 | µf | 8 |
| 45 | µf | 8 |

[1] Phase-locked.

It is, thus, seen that the present invention provides a means for precisely converting a square wave to a sinusoidal wave wherein the frequencies to be generated are in the low range where conventional methods of conversion would require the inclusion of unfeasibly large circuit parameters. The present invention provides a concise conversion means at frequencies far below those which may be realized with conventional LC circuitry.

Although this inversion has been described with respect to a particular embodiment thereof, it is not to be so limited as changes might be made therein which are within the scope of the invention as defined by the appended claims.

I claim:

1. Signal shaping means comprising a first amplifier including phase inverting means, said first amplifier comprising first and second stages, said first stage comprising a grounded base transistor amplifier and said second stage comprising a grounded collector transistor amplifier; a source of symmetrical square waves connected to the input of said first amplifying means, a signal translating means receiving the output from said first amplifying means and being adapted to develop an output in phase with the input thereto, said signal translating means comprising a grounded emitter third transistor amplifier stage, said phase shift network being connected between the emitters of said first and third stages, said phase shifting means being adapted to present a phase shift of 180° to frequencies equal that of the fundamental harmonic of said square-wave input signal, said amplifier and signal translating means and phase shift means being adjusted to collectively exhibit a gain of less than unity and being responsive to the presence of said square-wave input signal to develop a sinusoidal output signal from said signal translating means at the fundamental frequency of said square-waves and phase-locked therewith.

2. Signal shaping means as defined in claim 1 wherein said first, second and third transistor amplifier stages collectively phase shift said square-wave signals 180° and said phase shifting network comprises a plurality of cascaded RC networks collectively adapted to shift the fundamental frequency of said square-wave input signals by 180°.

3. Signal shaping means as defined in claim 2 further comprising non-frequency-responsive degenerative feedback means connected between said third amplifier stage and said second amplifier stage.

References Cited in the file of this patent

UNITED STATES PATENTS

| | | |
|---|---|---|
| 2,909,623 | Blecher | Oct. 20, 1959 |
| 2,912,654 | Hansen | Nov. 10, 1959 |
| 2,941,160 | Blake et al. | June 14, 1960 |
| 3,002,109 | Baird | Sept. 26, 1961 |

FOREIGN PATENTS

| | | |
|---|---|---|
| 581,419 | Great Britain | Oct. 11, 1946 |